United States Patent [19]

Olas

[11] Patent Number: 4,519,893
[45] Date of Patent: May 28, 1985

[54] MAGNETIC DISC STORAGE CONTAINER

[75] Inventor: Richard J. Olas, Crystal Lake, Ill.

[73] Assignee: KoMac Enterprises, Inc., Crystal Lake, Ill.

[21] Appl. No.: 511,408

[22] Filed: Jul. 7, 1983

[51] Int. Cl.³ .............................................. B65D 85/30
[52] U.S. Cl. ................................... 206/311; 206/45.2; 206/425; 206/444
[58] Field of Search ............... 206/44 B, 44 R, 45.11, 206/45.13, 45.17, 45.2, 45.21–45.27, 309, 311, 312, 313, 425, 444; 220/4 B, 4 E, 69, 306, 352; 229/DIG. 3

[56] References Cited

U.S. PATENT DOCUMENTS

| | | | |
|---|---|---|---|
| 282,742 | 8/1883 | May | 206/425 |
| 533,053 | 1/1895 | Cooke, Jr. | 206/425 |
| 566,375 | 8/1896 | Burrage | 206/425 |
| 1,375,794 | 4/1921 | McSheehy | 229/DIG. 3 |
| 2,258,666 | 10/1941 | Walker | 206/425 |
| 2,564,244 | 8/1951 | Bibler | 206/45.2 |
| 3,141,555 | 7/1964 | Funke et al. | 206/44 R |
| 3,164,350 | 1/1965 | Taub | 206/44 R |
| 3,575,284 | 4/1971 | Holt | 206/425 |
| 4,255,872 | 3/1981 | Williams, Sr. | 220/339 |
| 4,356,918 | 11/1982 | Kahle et al. | 206/444 |

FOREIGN PATENT DOCUMENTS

| | | | |
|---|---|---|---|
| 0023587 | 4/1949 | Finland | 229/DIG. 3 |
| 0734212 | 7/1955 | United Kingdom | 229/DIG. 3 |

Primary Examiner—George E. Lowrance
Assistant Examiner—Jimmy G. Foster
Attorney, Agent, or Firm—Thomas W. Speckman

[57] ABSTRACT

A storage container for storing magnetic discs providing a tightly closed, dust-free storage while also providing ready display of the discs and easy access to the discs for reduced handling in their removal from and insertion into the storage container. The magnetic disc storage container has a disc receptacle with a bottom wall having a solid hinge means parallel to and in the region of the front and back wall providing a closed, hingedly flexible bottom and a cover-holder providing a cover for the disc receptacle and in a separated inverted position providing a holder for the disc receptacle in an open, disc displaying manner.

13 Claims, 5 Drawing Figures

MAGNETIC DISC STORAGE CONTAINER

BACKGROUND OF THE INVENTION

1. Field of the Invention

This invention relates to a storage container for storing magnetic discs of the type used in electronic data processing systems. In the storage and use of such magnetic discs, it is critical that the discs be maintained in as dust-free environment as possible and not be folded or crimped, even at the edges, in storage and use. This invention provides a tightly closed magentic disc storage container for dust-free storage of the discs while also providing ready display of the discs and easy access to the discs for reduced handling of the disc in its removal from and insertion into the storage container.

2. Description of the Prior Art

Prior storage containers have involved standard pin-type hinges which would allow the entry of dust and there would be the danger of crimping or bending of the magnetic disc. Prior magnetic disc storage containers do not provide a smooth interior surface nor good display and access to the magnetic discs. Also, many of the prior magnetic disc containers have involved catch-type closures which provide an opening for dust to the interior of the container and have interior protrusions upon which the magnetic discs may catch or be bent. Magnetic discs have been stored in individual pocket envelopes which insert into the pocket of a folding book-type container which does not spread apart at the top and when the container is relatively full of discs, requires fingering of many of the discs in order to find the desired disc and then to extend a thumb and finger into the container in order to remove the desired disc, thereby creating the likelihood of bending or contaminating the desired disc and the adjacent discs.

SUMMARY OF THE INVENTION

This invention provides a magnetic disc storage container which in closed position is essentially dust-tight and in open or use position, the open end of the disc receptacle spreads apart providing display of individual discs urged slightly outwardly of the opening and provides easy access to removal or replacement of a desired magnetic disc in proper sequence in the storage container. The magnetic disc storage container of this invention comprises a rectangular shaped disc receptacle open at the top and a cover-holder open at the bottom. The disc receptacle has rectangular shaped front and back walls joined on opposite ends by two end walls, the end walls each cut in a corresponding central region for the full height of the end wall permitting separation of two portions of each end wall. A rectangular bottom wall joins the front, back and end walls. A separate cover-holder has a front and back wall, each having an inverted truncated V-shaped cutout open to the bottom, two solid end walls joining the ends of the front and back walls, and a solid rectangular top wall joining the front, back and end walls. The inverted truncated V-shaped cutout central leg joining portion has a width corresponding to the width of the disc receptacle end walls and is spaced from the top of the cover-holder, the inverted truncated V-shaped cutouts being aligned with each other. The disc receptacle front and back walls have open parallel slots extending perpendicuarly upwardly from the bottom at least the distance the central leg portion of the inverted truncated V is spaced from the top of the cover-holder. The slots in the front and back walls are joined by corresponding open slots in the disc receptacle bottom wall. The bottom wall of the disc receptacle is provided with a solid hinge means parallel to and in the region of the disc receptacle front and back walls, providing a closed hingedly flexible bottom with only the above mentioned slots being open. In the storage mode, the cover-holder fits snugly over the disc receptacle providing a closed dust-free storage container. In the use position, the cover-holder is inverted and the portions of the front and back walls between the central leg of the truncated V and the top are inserted into the slots provided in the front, back and bottom of the disc receptacle. The disc receptacle, having closed hinges along the front and back regions of the bottom, lies in an open position with the front and back adjacent the legs of the inverted truncated V-shaped cutout, while the portions of the front and back walls of the cover-holder extending into the above mentioned slots force the magnetic discs upwardly and partially out of the open top of the disc receptacle.

It is an object of this invention to provide a magnetic disc storage container which has a smooth interior surface which when closed, is relatively dust-tight.

It is another object of this invention to provide a magnetic disc storage container which may be spread partially open thereby providing good display of and easy access to individual desired magnetic discs.

It is yet another object of this invention to provide a magnetic disc storage container in which the cover portion also acts as a holder to hold a disc receptacle in an open position for display and easy access to desired discs.

It is still another object of this invention to provide a magentic disc storage container which in a use mode spreads open and provides display and easy access to individual magnetic discs by having a solid dust-proof and snag-proof hinge along the front edge and the back edge of the bottom of the magnetic disc receptacle.

BRIEF DESCRIPTION OF THE DRAWING

The above objects and further advantages of the invention will be seen upon reading of the description of preferred embodiments and by reference to the drawing wherein.

DESCRIPTION OF PREFERRED EMBODIMENTS

Figure 1:
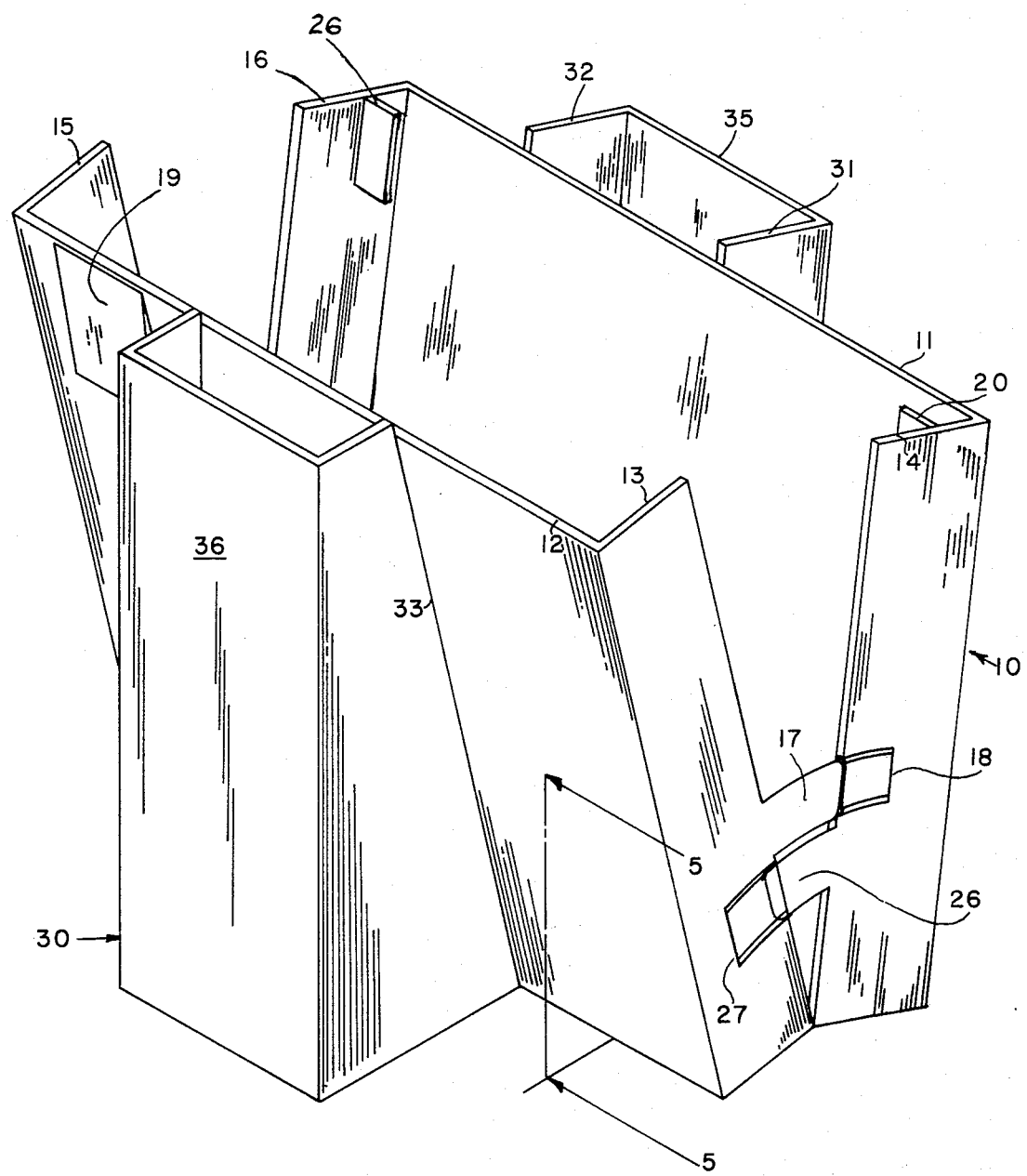
FIG. 1 is a perspective view showing one embodiment of a magnetic disc storage container of this invention in a use mode.

FIG. 1 shows disc receptacle 10 held in use position by engagement with inverted cover-holder 30. In the position shown in FIG. 1 the magnetic discs would extend outwardly beyond the top of walls 11 and 12, as will be explained further.

Figure 2:
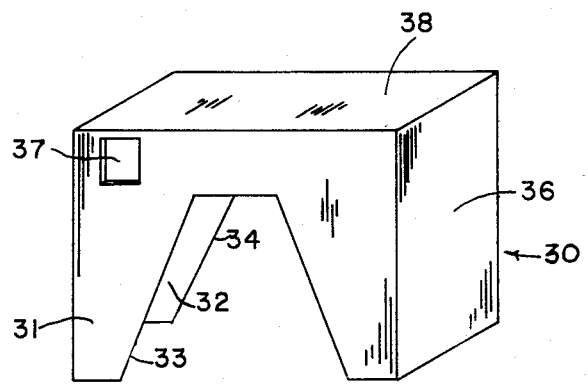
FIG. 2 is a perspective view of a cover-holder according to one embodiment of this invention.

Cover-holder 30 is shown in FIG. 2 as having an open bottom, front wall 31, back wall 32 and solid end walls 35 and 36 joining the ends of the front and back walls. The cover-holder has solid rectangular top wall 38 joining the front, back and end walls. Each front wall 31 and back wall 32 have have an inverted truncated V-shaped cutout 33 and 34, respectively, open to the bottom. The width of the central leg joining portion of the truncated V corresponds to the width of the disc receptacle end walls 13 and 14. The central leg joining portion of the truncated V is spaced from the top of cover-holder 30 a suitable distance corresponding to the desired distance of extension of the magnetic discs from the top of disc receptacle 10 in the position as shown in FIG. 1.

Figure 3:
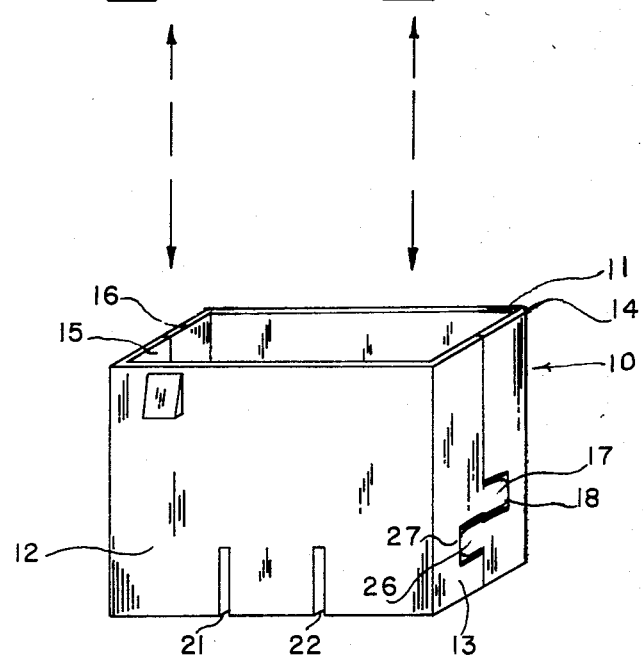
FIG. 3 is a perspective view of a disc receptacle in storage mode and ready for receipt of the cover-holder as shown in FIG. 2.
Figure 4:
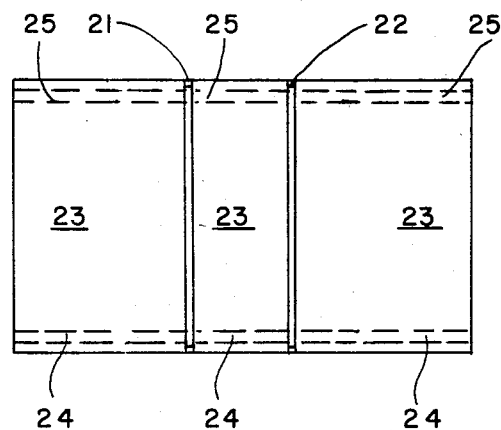
FIG. 4 is a bottom view of the disc receptacle shown in FIG. 3.
Figure 5:
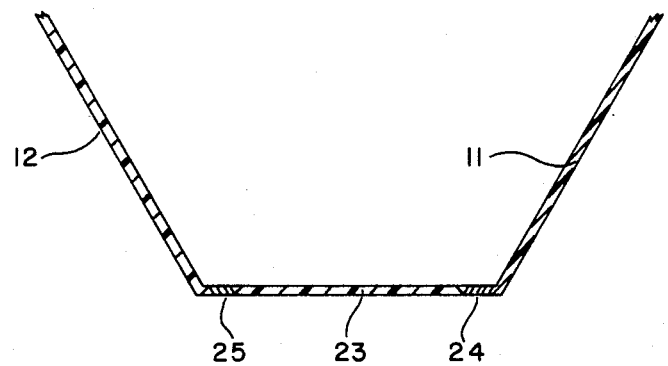
FIG. 5 is a partial sectional view as shown by 5—5 in FIG. 1 of the bottom portion of a disc receptacle spread apart in use mode.

FIG. 3 shows disc receptacle 10 in storage position for snugly receiving cover-holder 30 as indicated by the arrows between FIGS. 2 and 3. Disc receptacle 10 is open at the top and has rectangularly shaped front wall 12 and back wall 11. An end wall joins the ends of the front and back walls, the end walls being cut in a corresponding central region for the full height of each end wall permitting separation of portions 13 and 14 of one end wall and 15 and 16 of the other end wall, as shown in the use position in FIG. 1. The end walls may have one or more mating tabs, such as 17 and 26, extending into corresponding receptacle cutouts 18 and 27 for receiving the mating tabs. As shown in FIG. 1, the mating tabs prevent magnetic discs from being caught between the open end walls when the storage container is in use position. As best seen in FIGS. 3 and 4, the disc receptacle front and back walls have open parallel slots extending perpendicularly upwardly from the bottom the distance that the central leg portion of the inverted truncated V is spaced from the top 38 of cover-holder 30. Disc receptacle bottom wall 23 has open slots 21 and 22 joining front and back wall open slots 21 and 22 as shown in FIG. 4, forming two continuous open slots 21 and 22. Bottom 23 is solid except for the open slots 21 and 22. Bottom 23 has solid hinge means 24 and 25 parallel to and in the region of the juncture of back wall 11 and front wall 12 with bottom 23, respectively. FIG. 5 shows a cross section through the junction of the front and back walls with the bottom showing the closed, generally flat, bottom 23 and solid hinge means 24 and 25 in the bottom and in the region of the front and back walls. Suitable solid hinge means may be provided by living hinges as known to the art. In a preferred embodiment the disc receptacle and the cover-holder are molded from a slightly flexible synthetic polymeric material and the solid hinges may be effected by providing a weakened zone of the flexible snythetic polymeric material. Polyolefin sheet materials are particularly well suited, such as polyethylene and polypropylene wherein the solid hinge is a zone of bottom 23 weakened by thinning the sheet plastic in the hinge area or by providing striations in the hinge area. Either of these methods of weakening to a suitable extent will permit opening of the disc receptacle to the position shown in FIG. 1 while retaining a generally flat closed bottom surface without openings or gaps in which the thin magnetic discs may become engaged and damaged.

In many instances it is desired to provide compartmentalization of the magnetic disc storage volume for easy access to control or program discs. This may be achieved by partition tabs 20 and 26 extending inwardly from opposite ends of the disc receptacle and spaced according to the number of discs desired to be placed in that location. The tabs, although shown at the top of the end walls in FIG. 1, may of course be located at any portion in the upper two-thirds of the end walls.

It is also desirable for cover-holder 30 to be held snugly in closed position over disc receptacle 10 so that if the closed magnetic disc storage container is lifted by the cover portion, it will stay in the tightly closed position. This may be readily accomplished by provision of closure wedge 19 in the upper portion of the front or back wall of disc receptacle 10 and provision of closure means receiving opening 37 in corresponding position in the front or rear wall of cover-holder 30. This provides a positive closure means which does not have any openings into the disc storage volume nor any protrusions into the disc storage volume. Since cover-holder 30 is preferably made of slightly flexible material, to withdraw cover-holder 30 from disc receptacle 10, it is necessary to positively depress closure means 19 and pull the two portions of the disc storage container apart as indicated by the arrows between FIGS. 2 and 3.

The disc storage container of this invention may be made in a variety of sizes to accommodate various sizes and numbers of magnetic discs. The magnetic disc storage container of this invention may be molded from any suitable and preferably slightly flexible synthetic polymeric material. Due to the design of the combination of parts of the magnetic disc container of this invention, a smooth interior disc storage volume is provided and the storage container may be maintained in closed storage position with reduced area of openings which could permit entry of dust or other foreign materials to damage the discs. In open or use position, the magnetic disc storage container of this invention provides both display of and easy access to individual magnetic discs without danger of magnetic discs becoming caught in hinges, openings or obstructions in the disc storage volume of the container.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A magnetic disc storage container comprising: a rectangular shaped disc receptacle open at the top and comprising a rectangular shaped front and back wall; two end walls joining the ends of said front and said back walls, said end walls each cut in a corresponding central region for the full height of each said end wall permitting separation of two portions of each end wall; and a rectangular bottom wall joining said front, said back, and said end walls;

a cover-holder open at the bottom and comprising a front wall and a back wall; two solid end walls joining the ends of said front and said back walls; and a solid rectangular top wall joining said front, said back and said end walls; each said front and back wall having an inverted truncated V-shaped cutout open to the bottom and the width of the central leg joining portion of said truncated V corresponding to the width of said disc receptacle end walls and spaced from the top of said cover holder, said inverted truncated V-shaped cutouts aligned with each other;

said disc receptacle front and back walls having open parallel slots extending perpendicularly upwardly from the bottom the distance said central leg portion of said inverted truncated V is spaced from said top of said cover-holder, said slots spaced apart the width of said cover-holder end walls; and said disc receptacle bottom wall having open slots joining said front and back wall open slots and having a solid hinge means parallel to and in the region of each disc receptacle front and back wall providing a closed hingedly flexible bottom with only said slots open.

2. The magnetic disc storage container of claim 1 wherein each said portion of said disc receptacle end wall is of about equal size.

3. The magnetic disc storage container of claim 1 wherein one said portion of each end wall has a mating tab extending from said cut edge and the other said portion has a mating tab receptacle cutout for receiving said mating tab.

4. The magnetic disc storage container of claim 1 wherein a solid closure means is provided on the upper region of the outer surface of said disc receptacle front wall, and a corresponding closure means receiving means is provided in the upper region of the inner surface of said cover-holder front wall.

5. The magnetic disc storage container of claim 1 wherein said solid hinge means comprises a living hinge.

6. The magnetic disc storage container of claim 1 wherein said disc receptacle and said cover-holder are a slightly flexible synthetic polymeric material.

7. The magnetic disc storage container of claim 6 wherein said synthetic polymeric material is a polyolefin.

8. The magnetic disc storage container of claim 7 wherein said polyolefin is selected from the group consisting of polyethylene and polypropylene.

9. The magnetic disc storage container of claim 1 wherein said solid hinge means comprises a polyolefin sheet material.

10. The magnetic disc storage container of claim 1 wherein said disc receptacle and said cover-holder are molded polyolefin and said solid hinge means comprises a weakened portion of said polyolefin.

11. The magnetic disc storage container of claim 10 wherein said weakened portion of polyolefin comprises a thinned portion.

12. The magnetic disc storage container of claim 10 wherein said weakened portion of polyolefin comprises a striated portion.

13. The magnetic disc storage container of claim 1 wherein one said portion of each end wall has a mating tab extending from said cut edge and the other said portion has a mating tab receptacle cut out for receiving said mating tab, and wherein a solid closure means is provided on the upper region of the outer surface of said disc receptacle front wall and a corresponding closure means receiving means is provided in the upper region of the inner surface of said cover-holder front wall, and wherein said disc receptacle and said cover-holder are molded polyolefin and said solid hinge means comprises a weakened portion of said polyolefin.

* * * * *